United States Patent [19]
Tibbs

[11] 3,923,104
[45] Dec. 2, 1975

[54] FORWARD ANGLE PLOW SWEEP
[76] Inventor: Robert C. Tibbs, Hospital Drive, Cleveland, Miss. 38732
[22] Filed: Oct. 18, 1974
[21] Appl. No.: 516,130

[52] U.S. Cl. ............... 172/730; 172/765; 172/733; 172/19; 172/720
[51] Int. Cl.² ................... A01B 39/18; A01B 39/26
[58] Field of Search ...... 171/83; 172/730, 731, 732, 172/733, 765, 766, 770, 720, 19

[56] References Cited
UNITED STATES PATENTS

| | | |
|---|---|---|
| 336,160 | 2/1886 | Ritch et al. .......................... 172/730 |
| 620,421 | 2/1899 | Cox...................................... 172/19 |
| 944,859 | 12/1909 | Harris.................................. 172/19 |
| 1,085,359 | 1/1914 | Roosevelt ........................ 172/733 X |
| 1,422,418 | 7/1922 | Colby.............................. 172/720 X |
| 2,642,305 | 6/1953 | Butler.............................. 172/766 X |

*Primary Examiner*—George J. Marlo
*Attorney, Agent, or Firm*—Clarence A. O'Brien; Harvey B. Jacobson

[57] ABSTRACT

A plow sweep construction comprising a horizontal plate is provided including front and rear marginal edges. The center portion of the rear marginal edge includes structure for attaching the base plate to the lower end of the depending tool support shank and the front marginal edge portion of the plate includes generally straight opposite end portions inclined slightly forwardly toward the remote end portions. Also, the rear marginal edge of the plate includes generally straight opposite end portions inclined forwardly toward their remote end portions. The forward inclination of the opposite end portions of the rear marginal edge portion is greater than the forward inclination of the corresponding end portions of the front marginal edge portion, whereby the opposite side portions of the plate, on opposite sides of the longitudinal center line thereof, are at least slightly outwardly tapered toward their free ends. Also, the upper surface of each opposite side portion of the plate includes a plurality of spaced apart upstanding and generally parallel front-to-rear extending fins which are slightly rearwardly convergent toward the longitudinal center line of the plate.

10 Claims, 5 Drawing Figures

U.S. Patent Dec. 2, 1975 3,923,104
Fig. 1
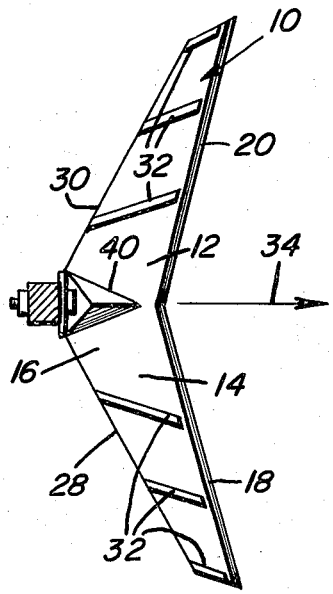
Fig. 2
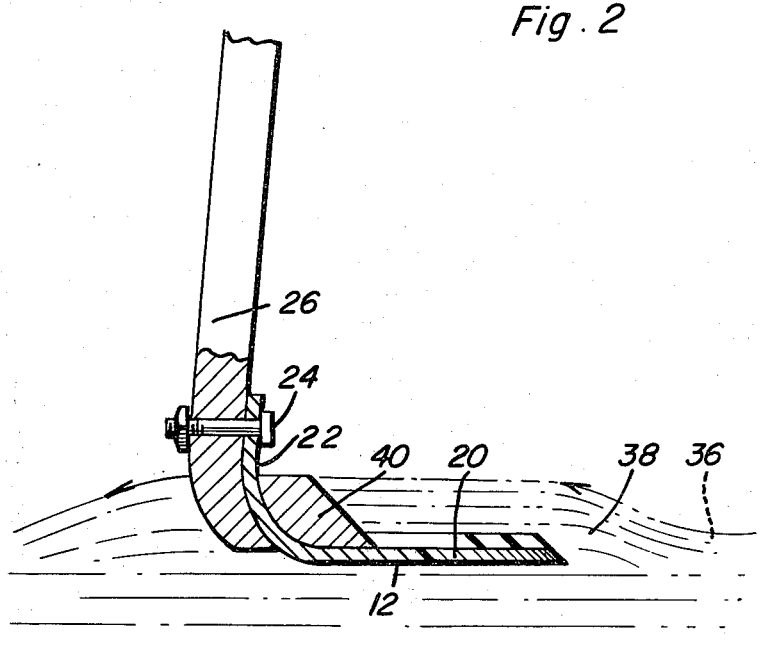
Fig. 4
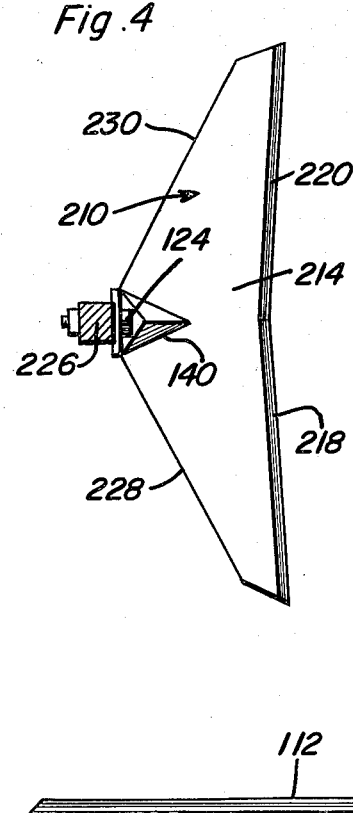
Fig. 5
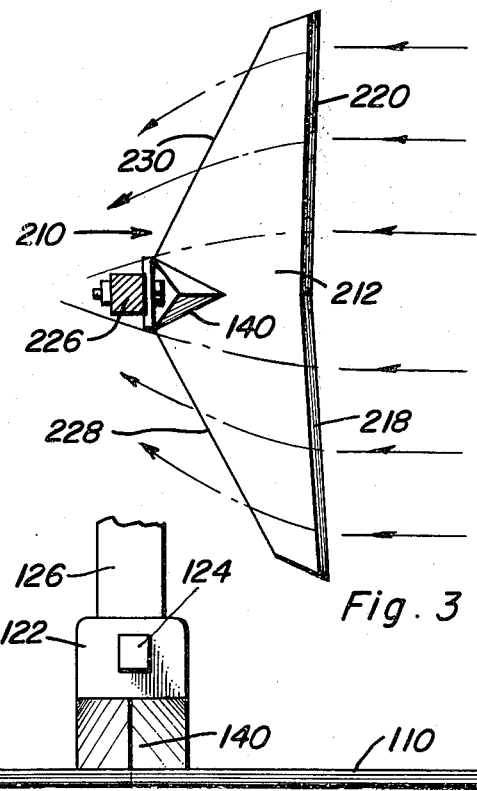
Fig. 3

FORWARD ANGLE PLOW SWEEP

BACKGROUND OF THE INVENTION

In cultivating row crops in which a band of herbicide has been applied along the plant rows, it is desirable to cultivate the ground between the rows in a wide path extending up to the herbicide band and without throwing soil from the cultivated center path onto the herbicide treated band. However, substantially all conventional forms of plow sweeps and other cultivating devices tend to scatter the soil being cultivated outwardly of the center path of the soil cultivating tool onto the adjacent herbicide bands. In order to counteract this throwing of cultivated dirt onto the herbicide bands, plow sweeps and other soil cultivating tools have been provided with rearwardly extending opposite side wings including inwardly directed rear end portions to constrain the cultivated soil and to thereafter direct the cultivated soil back in toward the center path of the cultivation. However, these additional wings represent additional cost factors, additional maintenance problems and are not necessarily wholly effective in performing the desired function.

Examples of plow sweeps similar to the instant invenetion are disclosed in U.S. Pat. Nos. 336,420, 403,118, 539,289, 1,224,418 and 1,743,296.

BRIEF DESCRIPTION OF THE INVENTION

The plow sweep of the instant invention has a plan shape not unlike that of a pair of rearwardly swept airplane wings and a second form of the invention includes a sweep having a plan shape not unlike that of a delta-shaped aircraft wing. However, the plow sweeps of the instant invention are designed to be advanced rearwardly in relation to the normal direction of movement of rearwardly swept and delta-shaped aircraft wings whereby the leading transverse edge of the plow sweep which is forwardly and downwardly beveled includes a pair of opposite end portions disposed on opposite sides of the longitudinal center of the sweep which are at least slightly forwardly inclined toward their remote ends. This slight inclination of the opposite side portions of the leading edge of the plow sweep initially directs soil being cultivated by the sweep in a slightly inward direction toward the center path of soil being cultivated and thus the cultivated soil is not scattered outwardly of the path of movement of the cultivating sweep and onto adjacent herbicide bands. Further, one form of the invention disclosed herein includes a plurality of spaced apart upstanding and generally parallel front-to-rear extending fins which project upwardly from the upper surface of the opposite side portions of the sweep and are slightly rearwardly convergent toward the longitudinal center line of the sweep. By the addition of the fins a deeper cut being made in the soil does not exceed the capacity of the sweep to direct the cultivated soil at least slightly inwardly toward the center of the cultivator sweep.

The main object of this invention is to provide an improved cultivator plow sweep which will be capable of performing normal cultivating operations between rows of plants having bands of herbicide extending therealong and without the soil in the path of the cultivator sweep being scattered laterally outwardly onto the adjacent bands of herbicide.

Another object of this invention, in accordance with the immediately preceding object, is to provide an improved cultivator sweep which will be effective in the prevention of laterally outwardly scattering the soil cultivated thereby even though the cultivator sweep may make a deep cut in the ground to be cultivated.

Another important object of this invention is to provide a cultivator sweep construction which may be readily attached to various forms of depending tool support shanks.

A final object of this invention to be specifically enumerated herein is to provide a plow sweep in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a first form of plow sweep constructed in accordance with the present invention and with a supporting tool shank portion illustrated in horizontal section;

FIG. 2 is an enlarged side elevational view of the assemblage illustrated in FIG. 1;

FIG. 3 is an enlarged front elevational view of a second form of cultivator sweep similar to that form illustrated in FIGS. 1 and 2 but which does not include upstanding soil directing fins;

FIG. 4 is a top plan view of a third form of cultivator sweep constructed in accordance with the present invention; and FIG. 5 is a top plan view similar to FIG. 4 and illustrating the manner in which soil acted upon by the third form of plow sweep is directed inwardly toward the center path of movement of the sweep.

DETAILED DESCRIPTION OF THE INVENTION

Referring now more specifically to the drawings, the numeral 10 generally designates a first form of plow sweep constructed in accordance with the present invention. The plow sweep 10 includes a horizontal plate 12 including front and rear marginal portions 14 and 16. The front marginal portion 14 includes two generally straight opposite end portions 18 and 20 disposed on opposite sides of a center front-to-rear extending vertical plane disposed centrally intermediate the opposite side marginal portions of the plate 12 and the center portion of the rear marginal edge portion 16 of the plate 12 includes an upwardly curving tongue portion 22 which is secured, as by a fastening bolt 24, to the lower end of a dependingly supported tool support shank which may comprise a part of any conventional form of wheeled cultivator assembly (not shown) or cultivator assembly mounted from a tractor.

From FIG. 1 of the drawings it may be seen that the opposite end portions 18 and 20 are forwardly inclined toward their remote ends. Further, the rear marginal edge portion 16 also includes a pair of generally straight opposite end portions 28 and 30. The opposite end portions 28 and 30 of the rear marginal edge 16 are also forwardly inclined toward their remote ends.

The forward inclination of the outer ends of the end portions 28 and 30 is greater than the forward inclination of the end portions 18 and 20, whereby corresponding opposite end edge portions 18 and 20 and 28 and 30 are outwardly convergent toward their free ends.

The opposite end portions 18 and 20 are forwardly and downwardly beveled and the upper surface of the plate 12 includes a plurality of spaced apart upstanding and generally parallel front-to-rear extending fins 32 on each side of the longitudinal center plane of the body 12. The fins 32 are slightly rearwardly convergent toward the center longitudinal plane of the plate 12 and their purpose will be more fully set forth hereinafter.

In operation, as the sweep 10 is forwardly advanced in the direction of the arrow 34 in FIG. 1 with the plate 12 disposed slightly beneath the surface 36 of the ground 38 being cultivated, the ground acted upon by the forwardly and downwardly beveled end portions 18 and 20 tends to slide inwardly along these beveled edges toward the longitudinal center axis of the path of movement of the body or plate 12. Thus, that portion of the soil being cultivated which passes over the plate 12 is directed slightly inwardly toward the center path of movement of the plate 12. In this manner, soil being acted upon by the plate 12 is not scattered laterally outwardly of the path of movement of the plate to be thrown onto bands of herbicide extending along adjacent rows of crops. Further, the fins 32 ensure that the dirt being cultivated and which passes over the plate 12, even though a deep cut is being made in the ground 38 is acted upon by the fins and thus also directed inwardly toward the center path of movement of the plate 12. Still further, the center portion of the plate 12 includes a forwardly tapering and pointed soil diverting body 40 for smoothly diverting the soil passing over the center portion of the plate 12 about the lower end of the shank 26 and the tongue portion 22.

With attention now invited more specifically to FIG. 3 of the drawings there may be seen a modified form of plow sweep referred to in general by the reference numeral 110 and which is substantially identical to the sweep 10, components of the sweep 110 corresponding to the various components of the sweep 10 being designated by corresponding reference numerals in the 100 series. The only difference between the sweep 110 and the sweep 10 is that the sweep 110 does not include the equivalent of the fins 32 on the sweep 10.

With reference now more specifically to FIGS. 4 and 5 of the drawings there may be seen a third form of cultivator sweep referred to in general by the reference numeral 210 and which is similar to the sweep 10 and has the components thereof having corresponding components in the sweep 10 designated by corresponding reference numerals in the 200 series.

The sweep 210 differs from the sweep 10 in that the sweep 210 is also devoid of components corresponding to the fins 32. Further, the opposite end portions 218 and 220 of the forward marginal edge portion 214 of the sweep 210 are somewhat less forwardly inclined toward their outer ends than the end portions 18 and 20 of the forward marginal edge portion 14 on the plate or body 12. Nevertheless, as may be seen from FIG. 5, the slight forward inclination of the end portions 218 and 220 acting upon the soil being cultivated ensures that the soil passing over the plate 212 is directed inwardly toward the longitudinal center line of the path of movement of the cultivator 210.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A plow sweep construction comprising a horizontal plate including opposite side marginal portions and front and rear marginal portions each having generally straight opposite end portions disposed on opposite sides of a center front-to-rear extending vertical plane disposed centrally intermediate the opposite side marginal portions of said plate, the central portion of the rear marginal edge portion of said plate including means for support from the lower end portion of a dependingly supported tool shank, the opposite end portions of said front marginal portions being slightly forwardly inclined toward their remote ends.

2. The combination of claim 1 wherein the opposite end portions of said rear marginal edge portions are also slightly forwardly inclined toward their remote ends.

3. The combination of claim 2 wherein corresponding opposite end portions of said front and rear marginal edge portions are convergent toward their outer ends.

4. The combination of claim 1 wherein the upper surface of said plate includes a plurality of spaced apart, upstanding and generally parallel front-to-rear extending fins slightly rearwardly convergent toward said plane.

5. The combination of claim 4 wherein the opposite end portions of said rear marginal edge portions are also slightly forwardly inclined toward their remote ends.

6. The combination of claim 5 wherein corresponding opposite end portions of said front and rear marginal edge portions are convergent toward their outer ends.

7. The combination of claim 1 wherein said opposite end portions of said front marginal portion are relatively angulated approximately 30 degrees.

8. The combination of claim 7 wherein the upper surface of said plate includes a plurality of spaced apart, upstanding and generally parallel front-to-rear extending fins slightly rearwardly convergent toward said plane.

9. The combination of claim 7 wherein said opposite end portions of said front marginal portion are relatively angulated considerably less than 30°.

10. The combination of claim 1 wherein said front marginal portion is forwardly and downwardly beveled.

* * * * *